US011668177B2

(12) United States Patent
Al-AbdulJabbar

(10) Patent No.: US 11,668,177 B2
(45) Date of Patent: Jun. 6, 2023

(54) PREDICTING FORMATION TOPS AT THE BIT USING MACHINE LEARNING

(71) Applicant: Saudi Arabian Oil Company, Dhahran (SA)

(72) Inventor: Ahmad Mohammad Al-AbdulJabbar, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 75 days.

(21) Appl. No.: 17/183,611

(22) Filed: Feb. 24, 2021

(65) Prior Publication Data

US 2022/0268144 A1 Aug. 25, 2022

(51) Int. Cl.
*E21B 44/00* (2006.01)
*G06N 20/00* (2019.01)
*G06F 17/18* (2006.01)
*G06F 17/15* (2006.01)
*G01V 99/00* (2009.01)

(52) U.S. Cl.
CPC .......... *E21B 44/00* (2013.01); *G01V 99/005* (2013.01); *G06F 17/15* (2013.01); *G06F 17/18* (2013.01); *G06N 20/00* (2019.01); *E21B 2200/20* (2020.05); *E21B 2200/22* (2020.05)

(58) Field of Classification Search
CPC .. E21B 44/00; E21B 2200/20; E21B 2200/22; E21B 2200/00; G01V 99/005; G01V 99/00; G06F 17/15; G06F 17/10; G06F 17/00; G06F 17/18; G06N 20/00
See application file for complete search history.

(56) References Cited

U.S. PATENT DOCUMENTS

| 6,109,368 A * | 8/2000 | Goldman .............. E21B 49/003 |
| | | 702/9 |
| 7,044,238 B2 | 5/2006 | Hutchinson |
| 2015/0081222 A1* | 3/2015 | Laing ....................... G06N 5/04 |
| | | 702/9 |
| 2015/0345262 A1 | 12/2015 | Kpetchoto et al. |

(Continued)

FOREIGN PATENT DOCUMENTS

WO  WO 2020191360  9/2020

OTHER PUBLICATIONS

Al-Abduljabbar et al., "Predicting formation tops while drilling using artificial intelligence," SPE 192345, presented at the SPE Kingdom of Saudi Arabia Annual Technical Symposium and Exhibition, Dammam, Saudi Arabia, Apr. 23-26, 2018, 9 pages.

*Primary Examiner* — Mohamed Charioui
(74) *Attorney, Agent, or Firm* — Fish & Richardson P.C.

(57) ABSTRACT

Some implementations of the present disclosure provide a computer-implemented method that includes: accessing measurement data obtained from a drilling operation, wherein the measurement data show multiple measurements during the drilling operation when a drilling bit is located at a range of depths; based on the measurement data, using machine learning analytics to construct a model that predicts a formation top when the drilling bit reaches a depth; determining a correlation between the measurement data and the predicted formation top; and in response to determining the correlation exceeds a pre-determined threshold, applying the model to predict a formation top when the drilling bit reaches the depth.

17 Claims, 13 Drawing Sheets

(56) References Cited

U.S. PATENT DOCUMENTS

2018/0025269 A1\* 1/2018 Dursun ................. E21B 41/00
  175/24
2020/0309982 A1 10/2020 Jin et al.
2021/0073592 A1\* 3/2021 Morgan ............... G06K 9/6253

\* cited by examiner

PREDICTING FORMATION TOPS AT THE BIT USING MACHINE LEARNING

TECHNICAL FIELD

This disclosure generally relates to characterization of formation tops during a drilling process.

BACKGROUND

Formation tops refer to depths in a well (measured in feet below a reference elevation) where specific formations are found in the subsurface. Determining the formation tops is one aspect of emphasis when designing a well. The determination involves presenting the location where a casing point is set to cover troublesome zones, or to isolate high/low pressure areas.

SUMMARY

In one aspect, some implementations provide a computer-implemented method that includes: accessing measurement data obtained from a drilling operation, wherein the measurement data show multiple measurements during the drilling operation when a drilling bit is located at a range of depths; based on the measurement data, using machine learning analytics to construct a model that predicts a formation top when the drilling bit reaches a depth; determining a correlation between the measurement data and the predicted formation top; and in response to determining that the correlation exceeds a pre-determined threshold, applying the model to predict a formation top when the drilling bit reaches the depth.

Implementations may include one or more of the following features.

The multiple measurements include: rate of penetration (ROP), torque, rotation per minute (RPM), weight on bit (WOB), pumping rate, and stand pipe pressure (SPP). The multiple measurements further include: sensor measurements during a measurement while drilling (MWD) or logging while drilling (LWD) operation.

The method may further include: selecting a subset of the measurement data as input data to the model. The method may further include: determining a correlation of each type of measurement data with the predicted formation top; and selecting the subset of the measurement data based on the determined correlation. The method may further include: iteratively refining the model until the correlation exceeds the pre-determined threshold. Determining the correlation between the measurement data and the predicted formation top may include: determining a covariance matrix between the measurement data and the predicted formation top; and calculating the correlation based on the covariance matrix. The method may further include: validating the model based on additional measurement data obtained from the drilling operation in which the drilling bit is advanced further than the range of depths.

In another aspect, some implementations provide a computer system that includes one or more processors configured to perform operations of: accessing measurement data obtained from a drilling operation, wherein the measurement data show multiple measurements during the drilling operation when a drilling bit is located at a range of depths; based on the measurement data, using machine learning analytics to construct a model that predicts a formation top when the drilling bit reaches a depth; determining a correlation between the measurement data and the predicted formation top; and in response to determining that the correlation exceeds a pre-determined threshold, applying the model to predict a formation top when the drilling bit reaches the depth.

The implementations may include one or more of the following features. The multiple measurements may include: rate of penetration (ROP), torque, rotation per minute (RPM), weight on bit (WOB), pumping rate, and stand pipe pressure (SPP). The multiple measurements may further include: sensor measurements during a measurement while drilling (MWD) or logging while drilling (LWD) operation.

The operations may further include: determining a correlation of each type of measurement data with the predicted formation top; and selecting the subset of the measurement data based on the determined correlation. The operations may further include: iteratively refining the model until the correlation exceeds the pre-determined threshold. Determining the correlation between the measurement data and the predicted formation top may include: determining a covariance matrix between the measurement data and the predicted formation top; and calculating the correlation based on the covariance matrix. The operations may further include: validating the model based on additional measurement data obtained from the drilling operation in which the drilling bit is advanced further than the range of depths.

In another aspect, some implementations provide a non-transitory computer-readable medium comprising software instructions that, when executed by a computer processor, causes the computer processor to perform operations of: accessing measurement data obtained from a drilling operation, wherein the measurement data show multiple measurements during the drilling operation when a drilling bit is located at a range of depths; based on the measurement data, using machine learning analytics to construct a model that predicts a formation top when the drilling bit reaches a depth; determining a correlation between the measurement data and the predicted formation top; and in response to determining that the correlation exceeds a pre-determined threshold, applying the model to predict a formation top when the drilling bit reaches the depth.

Implementations may include one or more of the following features. The multiple measurements may include: rate of penetration (ROP), torque, rotation per minute (RPM), weight on bit (WOB), pumping rate, and stand pipe pressure (SPP), and sensor measurements during a measurement while drilling (MWD) or logging while drilling (LWD) operation. Determining the correlation between the measurement data and the predicted formation top may include: determining a covariance matrix between the measurement data and the predicted formation top; and calculating the correlation based on the covariance matrix. The operations may further include: validating the model based on additional measurement data obtained from the drilling operation in which the drilling bit is advanced further than the range of depths.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to a computerized method to predict formation tops based on real-time measurements from the surface during a drilling operation. Examples of surface measurements during drilling include: rate of penetration (ROP), torque, RPM, weight on bit (WOB), pumping rate in gallons per minute (GPM), and stand pipe pressure (SPP). Implementations can leverage machine learning (ML) algorithms to relate hydraulic and mechanical parameters to the formations being drilled to identify each formation top individually and in realtime. The implementations can relate drilling parameters to different formations by using machine learning (ML) and artificial intelligence (AI) to enable formation picks at the level of the drilling bit. Based on values of drilling measurements that are recorded in real-time from the surface, the implementations can predict the formation picks with great accuracy. When the recorded values are changed while drilling, the implementations can utilize a model to determine what caused the rate of penetration (ROP) to change. The ability to distinguish between true change in the ROP and induced change in ROP can be advantageous because the ROP may change due to changes in other drilling parameters, or due to changes in the underlying formation.

The terminology used in the present disclosure includes the following terms.

Figure 5:
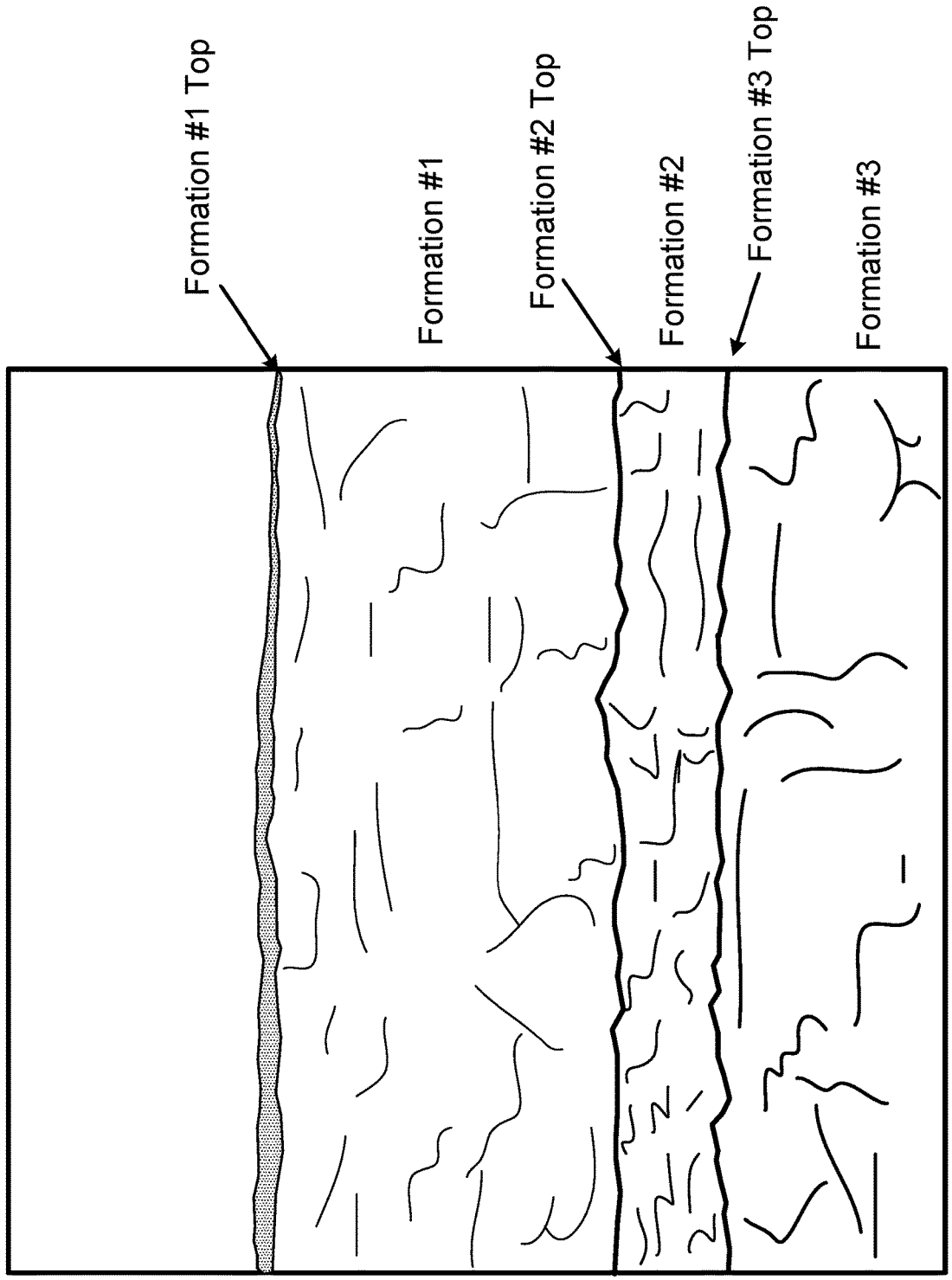
FIG. 5 illustrates formation layers as discussed in some implementations of the present disclosure.

The term "formation tops" refers to the depths in a well (measured in, for example, feet below a reference elevation) where formations are found in the subsurface. In simple terms, formation is a body of rock layer/layers that include dominantly a certain lithological type or combination of types. The formation top is the depth where the previous formation ends, and the new formation starts. FIG. 5 illustrates three formation layers, namely, formation #1, formation #2, and formation #3, along with the formation tops for each layer.

The term "offset well" refers to an existing wellbore that may be used as a guide for planning a well, for example, a planned production well. Many offsets could be referred to in the planning of a well, to identify subsurface geology and pressures. Offset well data may be combined with seismic data and prior experience. High quality offset well data is highly sought after by planners for optimizing their designs, and is also used retrospectively to benchmark performance. Where offset data is lacking, well planners will be more conservative, allowing for a greater range of contingencies and expenses.

The term "weight on bit" refers to the amount of downward force exerted on the drill bit. In some cases, the force may be measured in thousands of pounds. Weight on bit (WOB) can be measured at the surface or in the downhole. However, downhole measurement generally requires downhole sensor, for example, measurement while drilling (MWD) sensors. Generally, surface measurement is sufficient, example, weight on bit (WOB) can be provided by drill collars, which are thick-walled tubular pieces machined from solid bars of steel, usually plain carbon steel but sometimes of nonmagnetic nickel-copper alloy or other nonmagnetic premium alloys. Gravity acts on the large mass of the collars to provide the downward force for the bits to efficiently break rock. To accurately control the amount of force applied to the bit, the driller can monitor the surface weight measured while the bit is just off the bottom of the wellbore. Next, the drill string (and the drill bit), is slowly and carefully lowered until it touches bottom. After that point, as the driller continues to lower the top of the drill string, more and more weight is applied to the bit, and correspondingly less weight is measured as hanging at the surface. This reduction observed at the surface is the WOB.

The term "machine learning analytics" refers to the use of machine learning and applied statistics to predict unknown conditions based on the available data. Two general areas that fall under machine learning analytics are classification and regression. While classification refers to the prediction of categorical values, regression connotes the prediction of continuous numerical values. One machine learning implementation is also known as "supervised learning" where the "correct" target or y values are available. For illustration, the goal of some implementations is to learn from the available data to predict the unknown values with some defined error metrics. In supervised learning, for example, there are a set of known predictors (features) $x_1, x_2, \ldots, x_m$ which are known to the system as well as the target values $y_1, y_2, \ldots, y_n$, which are to be inferred. The system's objective is to train a machine learning model to predict new target values $y_1, y_2, \ldots, y_n$ by observing new features.

The implementations can employ a variety of machine learning algorithms. For classification, examples of prediction algorithms can include, logistic regression, decision trees, nearest neighbor, support vector machines, K-means clustering, boosting, and neural networks. For regression, examples of predication algorithms can include least squares regression, Lasso, and others. The performance of an algorithm can depend on a number of factors, such as the selected set of features, training/validation method and hyper-parameters tuning. As such, machine learning analytics can manifest as an iterative approach of knowledge finding that includes trial and error. An iterative approach can iteratively modify data preprocessing and model parameters until the result achieves the desired properties.

Figure 1A:
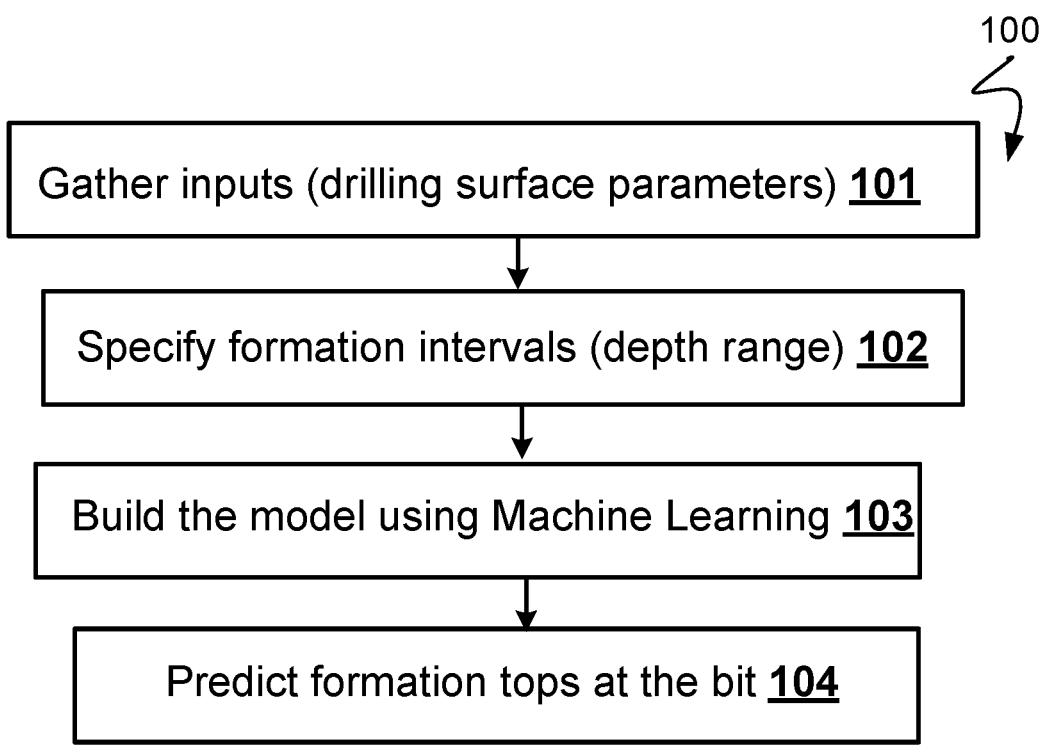
FIG. 1A shows an example of a workflow process according to an implementation of the present disclosure.

Implementations may use offset wells data, data from measurement at the surface including ROP charts, or more expensive downhole sensors (e.g. Gamma Ray data). Referring to FIG. 1A, an example of a work flow 100 may initiate by gathering inputs from measured drilling surface parameters (101). The drilling surface parameters may include, for example, rate of penetration (ROP), torque, rotation per minute (RPM), weight on bit (WOB), pumping rate in gallons per minute (GPM), and stand pipe pressure (SPP). The examples are non-limiting and may further include gamma ray (GR) data when measurement while drilling (MWD) or logging while drilling (LWD) is used.

The work flow 100 may then proceed to specifying formation intervals or the depth range for each formation (102). A formation interval refers to the interval between the formations. The work flow 100 may then build the model using machine learning (103). Based on the model, the work flow 100 may predict formation tops at the drill bit (104).

Figure 1B:
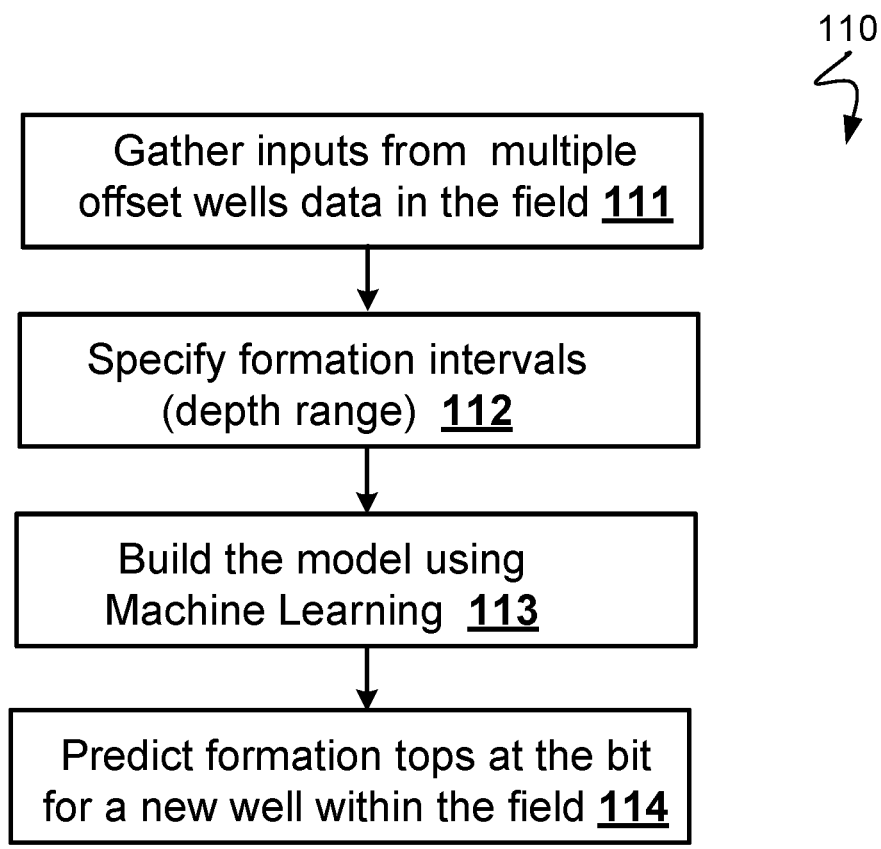
FIG. 1B shows an example of a workflow process without using downhole logging tools according to an implementation of the present disclosure.

While work flow 100 may use downhole logging tool, work flow 110 in FIG. 1B can operate without using downhole logging tools. As illustrated, work flow 110 may initiate by gathering inputs from measurement data obtained from multiple offset wells in the field (111). An offset well may refer to an existing wellbore that serves as a guide for planning a new well. The work flow 100 may then proceed to specifying formation intervals or the depth range for each formation (112). Based on the specification, the work flow 100 may then build the model using machine learning (113). Based on the model, the work flow 100 may predict formation tops at the drill bit (114).

Figure 2A:
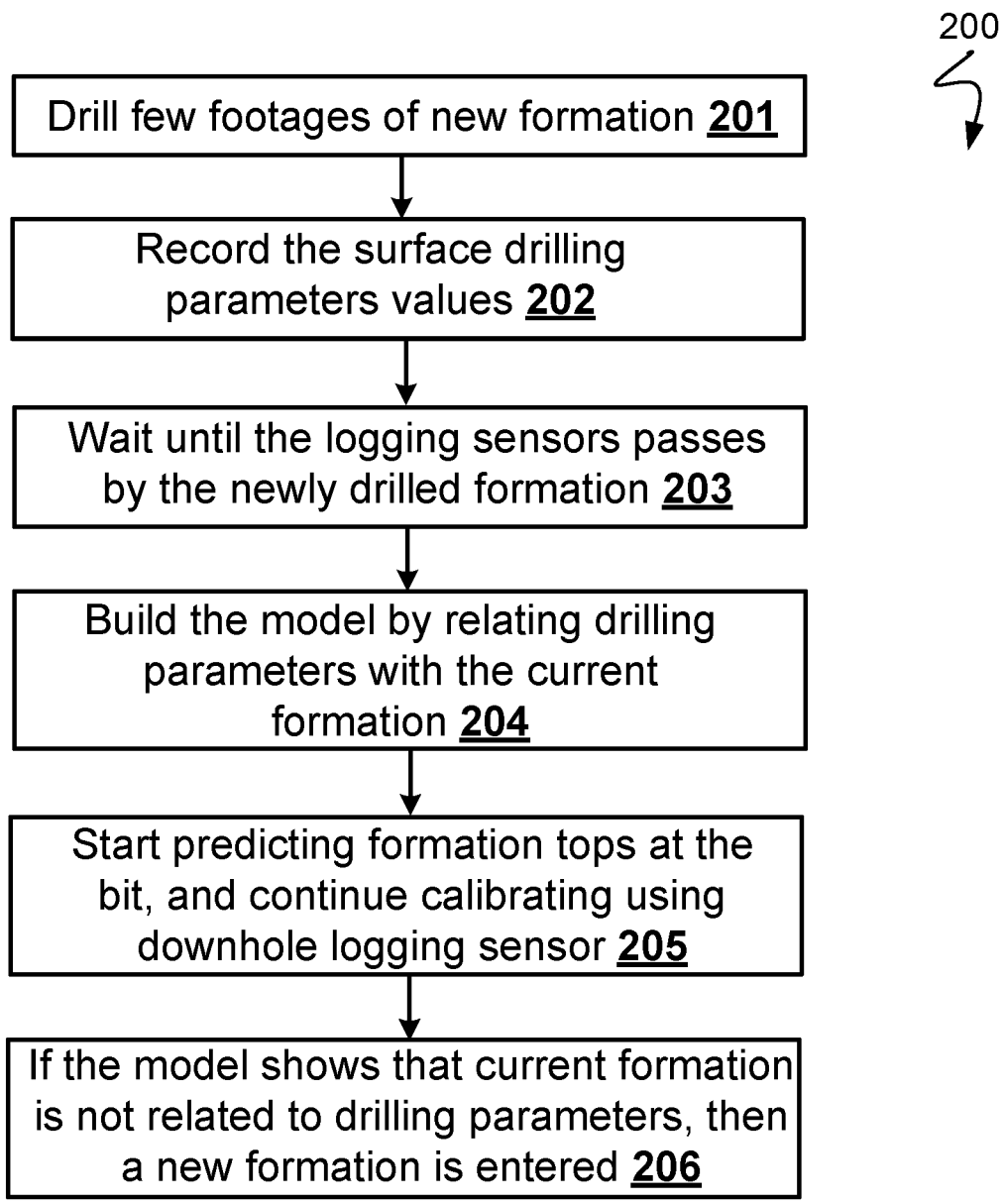
FIG. 2A shows an example of a workflow process using downhole logging tools according to an implementation of the present disclosure.

Implementations may establish the model by drilling new footages to gather initial data until the model is built, as illustrated in FIG. 1B. Alternatively or additionally. Pre-build the model using offset wells, as illustrated in FIG. 1A. The implementations may start by picking formation tops at the bit level. Each time a new formation is penetrated, the implementations may assign an index to this new formation and display a name for the new formation. Once a depth is passed, for example, as indicated by MWD/LWD sensors which may be mounted at a substantial distance higher than the bit level, the formation type/name can be evaluated. The evaluation may decide whether the model is in need of re-training. Additionally or alternatively, the evaluation may also decide whether the model is still valid, drilled section compromising four different formations is shown Referring to FIG. 2A, an example of a work flow 200 may operate without data from offset wells by incorporating downhole logging tools. Work flow 200 may initiate by drilling new footages of a new formation (201). Work flow 200 may record values of surface drilling parameters (202). The drilling surface parameters may include, for example, rate of penetration (ROP), torque, rotation per minute (RPM), weight on bit (WOB), pumping rate in gallons per minute (GPM), stand pipe pressure (SPP) and measurements from MWD/LWD sensors. The measurements from MWD/LWD sensors may be observed from the surface. Work flow 200 may wait until the logging sensors pass by the newly drilled formation (203). The wait may allow a continuous stream of realtime data to be recorded. Based on the recorded data, work flow 200 may build the model of machine learning analytics by relating the recorded drilling parameters with the current formation of the drilling operation (204). When the model is ready, work flow 200 may use the model to predict formation tops at the drilling bit. The prediction may be accompanied by continued calibration of the model output using downhole logging sensor (205). During the work flow 200, when the prediction of the model indicates that current formation is not related to drilling parameters, then the work flow 200 determines that a new formation is entered (206).

Figure 2B:
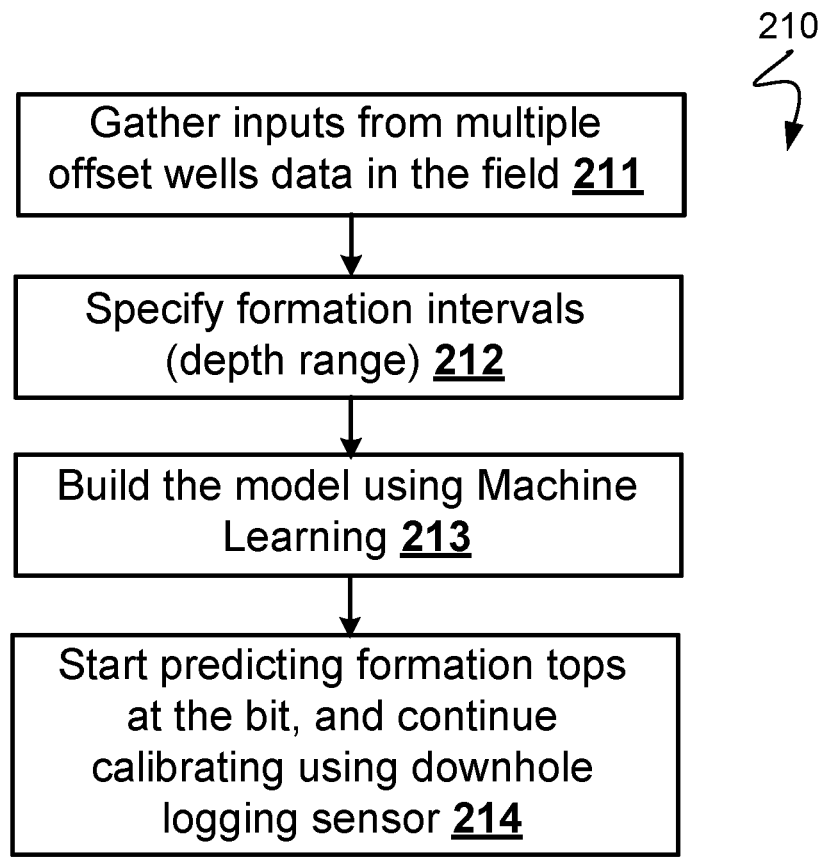
FIG. 2B shows another example of process workflow using downhole logging tools according to an implementation of the present disclosure.
Figure 3A:
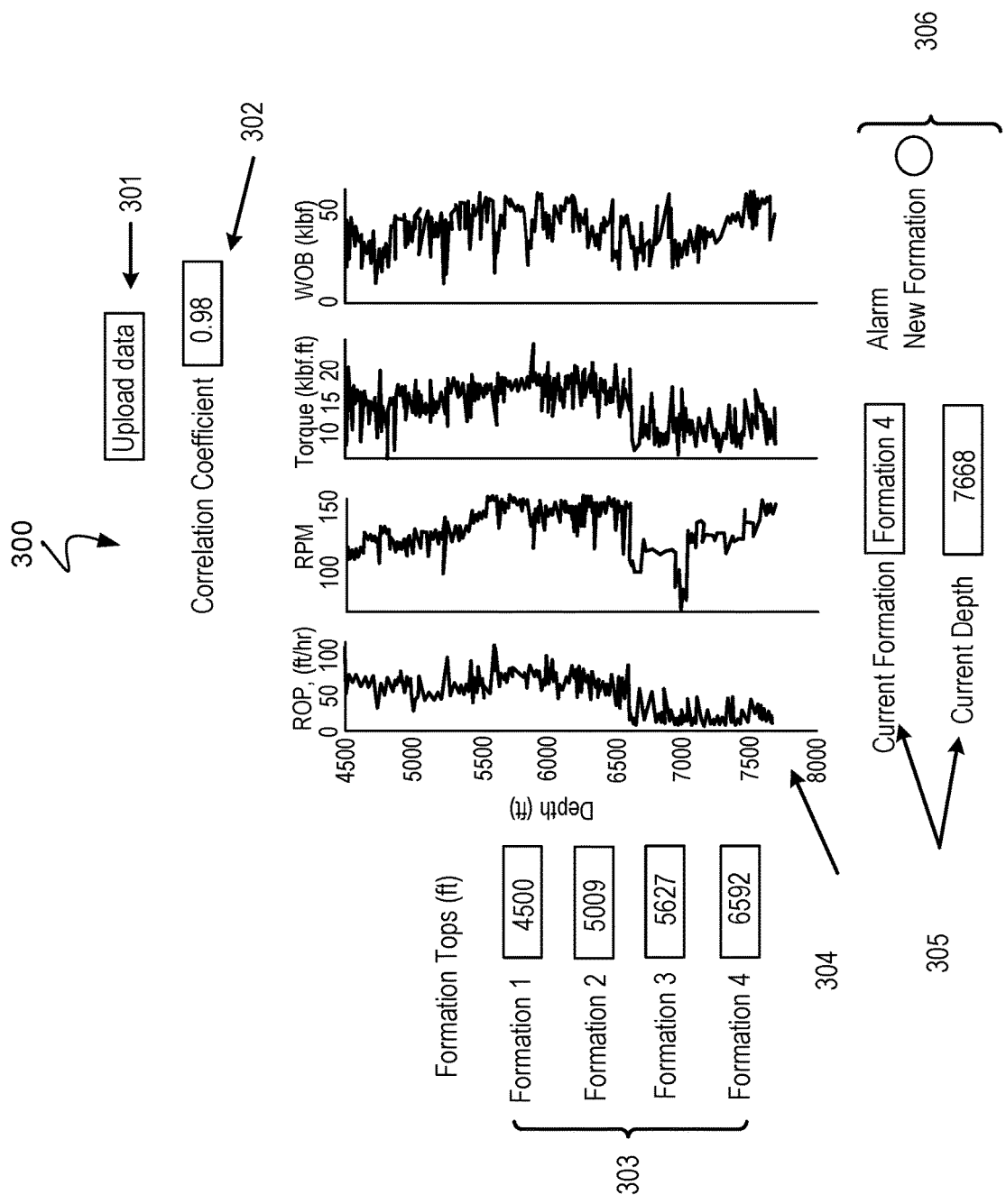
FIG. 3A-3E show examples of a software interface for predicting formation tops according to an implementation of the present disclosure.
Figure 3B:
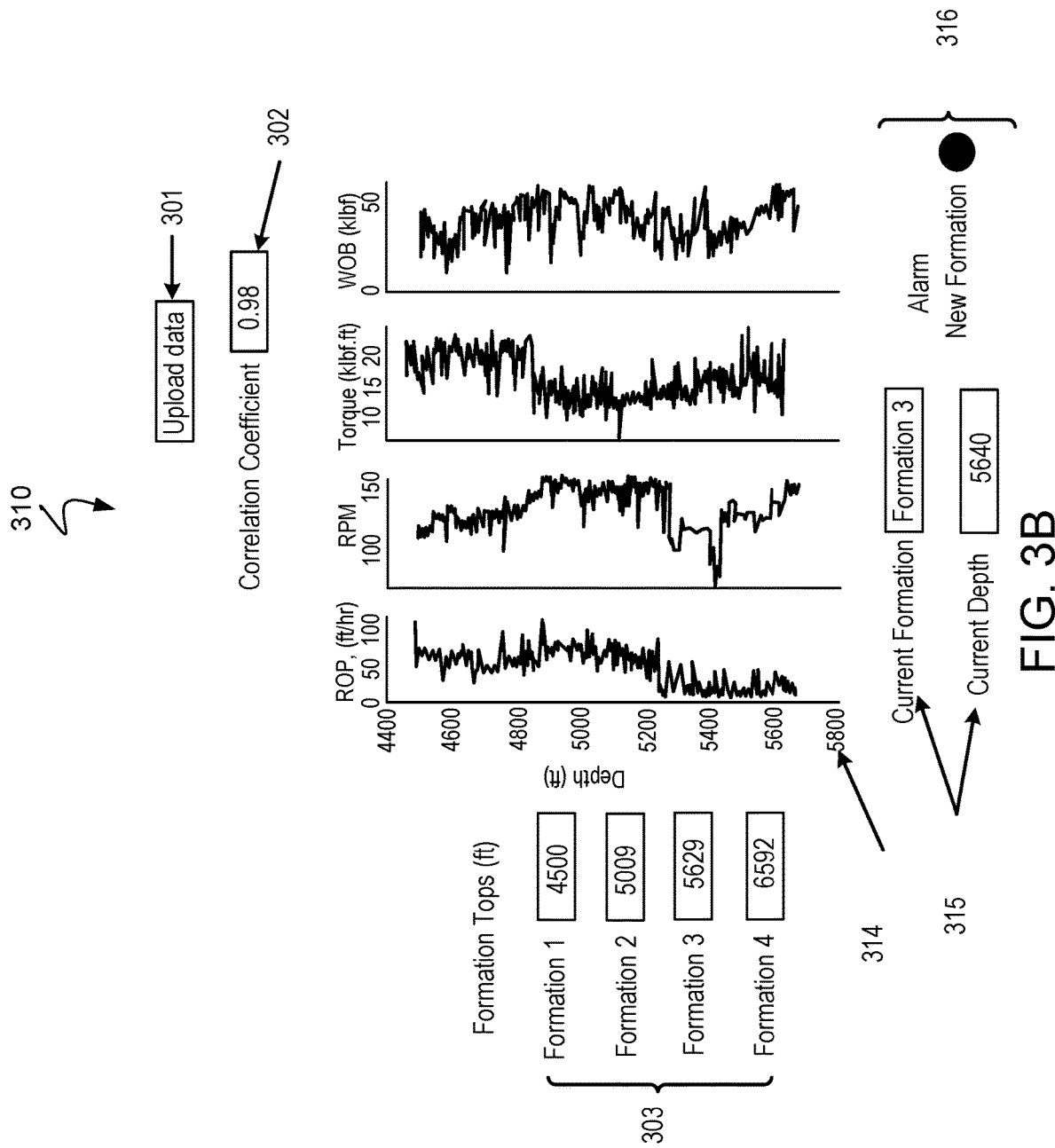
Figure 3C:
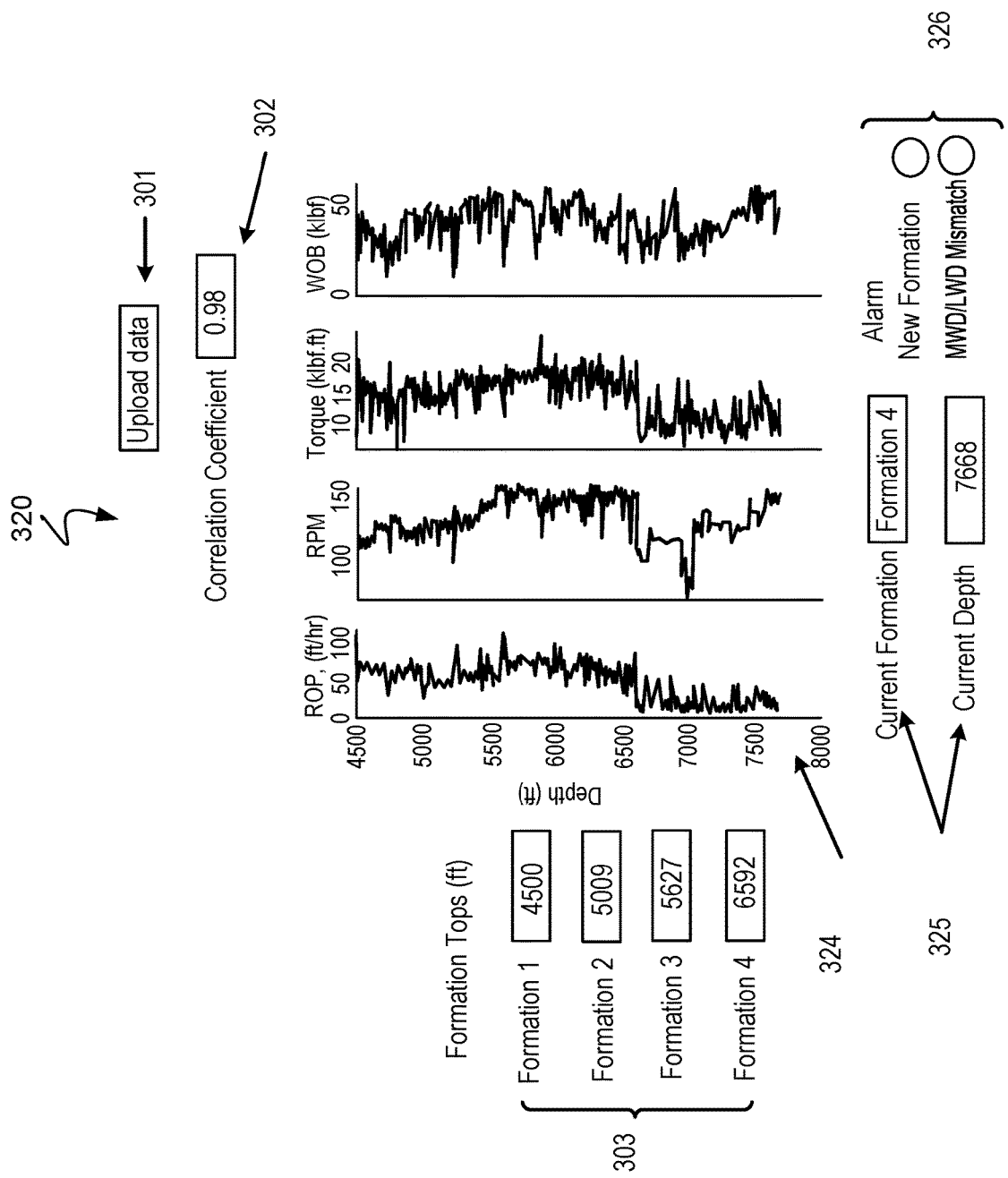
Figure 3D:
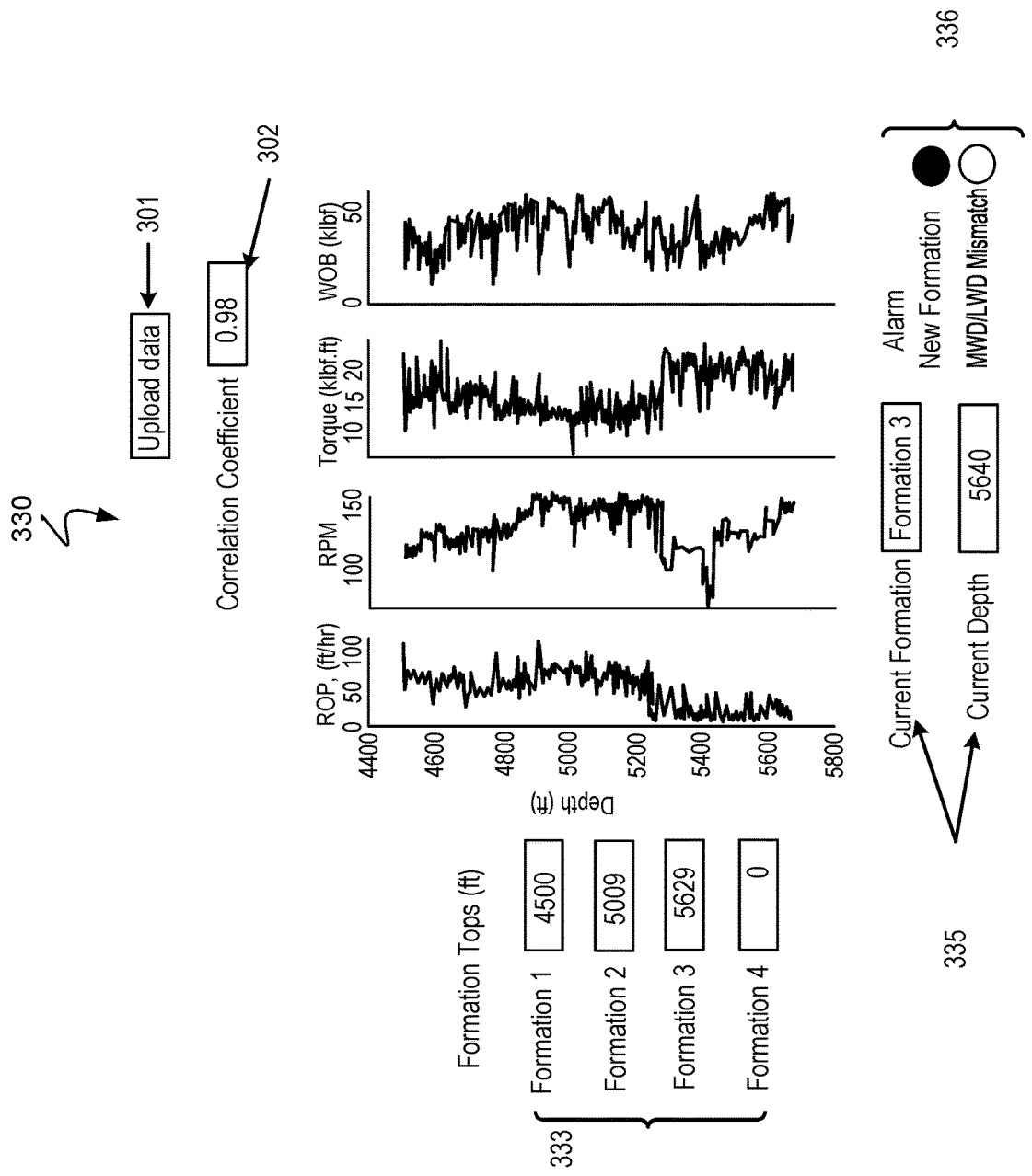
Figure 3E:
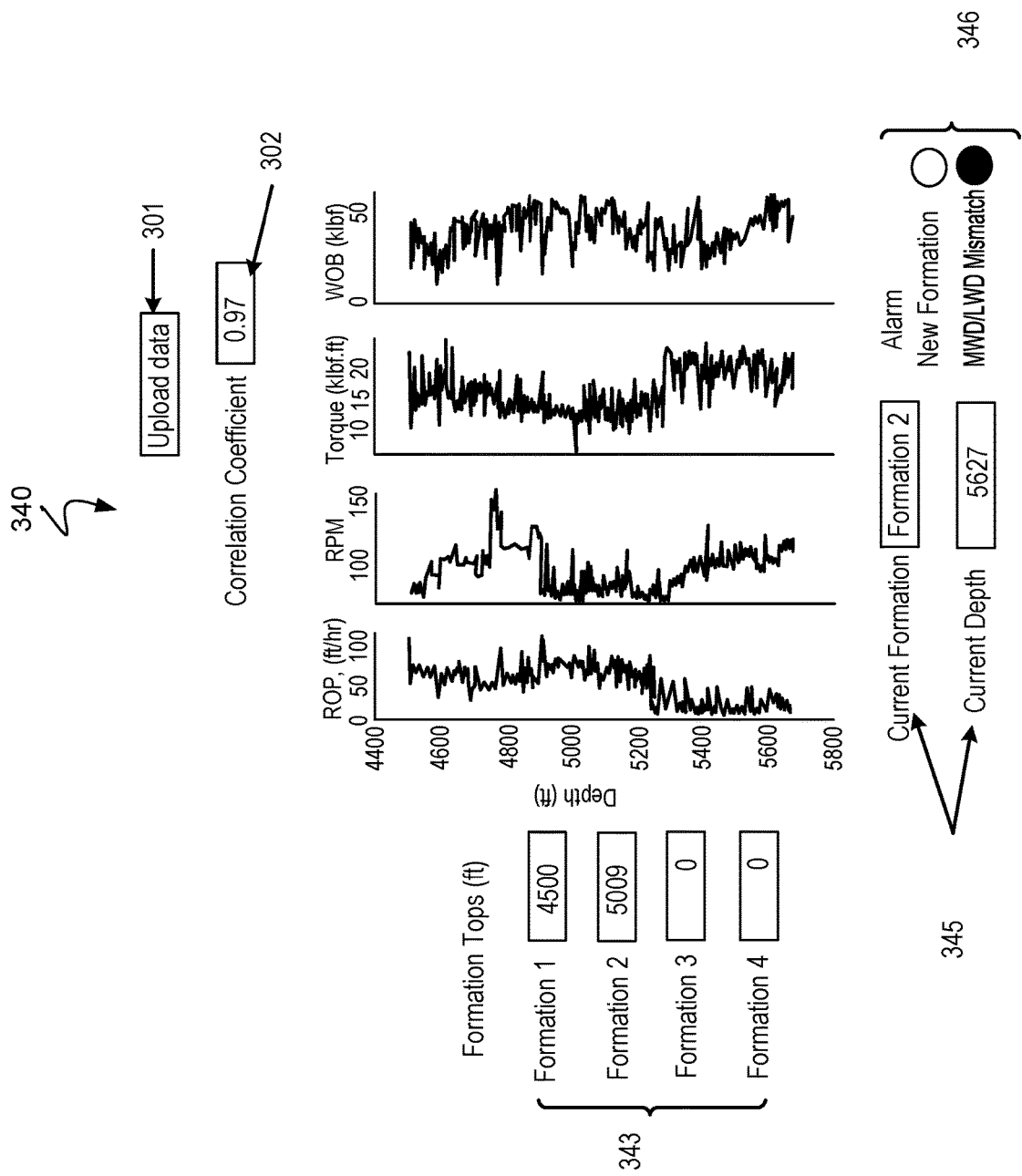

Referring to FIG. 2B, another example of work flow 210 may operate using data from one or more offset wells. Work flow 210 may initiate by gathering inputs from data obtained at multiple offset wells in the field (211). Work flow 210 may then proceed to specifying formation intervals or the depth range for each formation (212). Based on the gathered inputs and the specified formation interval/depth range, work flow 210 may build the predictive model using machine learning (213). When the model is ready, work flow 210 may use the model to predict formation tops at the drilling bit. The prediction may be accompanied by continued calibration of the model output using downhole logging sensor (214).

Referring to FIGS. 3A to 3E, some implementations include a software interface for operating a computer system to upload input data, train/refine a model, and use the model to make predictions. The software interface can present the predicted formation tops. For example, the implementations may upload the data from, for example, measurements taken from offset wells, or surface measurements when the drilling bit is engaged in drilling new footages of a formation. As illustrated in diagram 300, the software interface may present button 301 to allow the operator to upload the input data.

Based on the uploaded data, the implementations can automatically build the model using, for example, a machine learning algorithm. In some implementations using the machine learning algorithm, the software may monitor the correlation coefficient between the input data and the formation tops being predicted. In some cases, the correlation coefficient can be based on a co-variance matrix between the input data and the predicted outcome. When the correlation coefficient has passed a threshold, the model is considered applicable and may be applied to calculate formation tops based on subsequent input data. As illustrated in diagram 300, the software interface may present a field 302 for the operator to adjust the correlation coefficient.

In some implementation, the model can refresh the predicting calculation every time a new foot of formation is drilled. As illustrated in diagram 300, the software interface may indicate the formations encountered and predicted during drilling operations in listing 303, which shows a total of four formations, at various depths. Alongside the field 302, the software interface may present an area 304 presenting the plots of measurements including, for example, rate of penetration (ROP), rotation per minute (RPM), torque, and weight on bit (WOB). The input data may include measurements taken at the surface, or measurements taken from offset wells. In area 305, the software interface may present an indication of current formation and current depth for the drilling bit. In area 306, the software interface may present a button to indicate an alarm when a new formation is being entered during the drilling operation.

Diagram 310 further illustrates in area 315 that formation #3 is being entered along with the current depth for the drilling bit. Area 314 shows the plots of measurements data up to the current depth. Area 316 further includes an alarm indicating a new formation is being entered.

Diagram 320, further illustrates in area 325 the current formation and depth of the drilling bit. Area 326 includes an MWD/LWD mismatch button to flag a mismatch between the measured data and input data from the offset well. The new alarm is added to flag an exception when the MWD/LWD discovered different formation during validation, as explained further in diagrams 330, and 340. Diagram 330 illustrates area 335 indicating formation #3 at current depth. Area 336 further flags an alarm indicating a new formation is being entered. Here, the model predicted formation #3 at depth 5629 ft. During validation based on measurement data from MWD/LWD, diagram 340 illustrates area 345 indicating that formation #2 at current depth of 5627 ft. Once the MWD/LWD has passed this depth, the formation becomes formation #3. Here, the MWD/LWD is used as a reference depth. When the reference has reached the depth of 5627 ft, the MWD/LWD sensors detect that formation #3 is actually starting at 5627 ft (2 ft shallower than predicted). As a result, the model will calibrate itself to account for this mismatch. This mismatch caused area 346 to flag an alarm indicating the mismatch.

Figure 4:
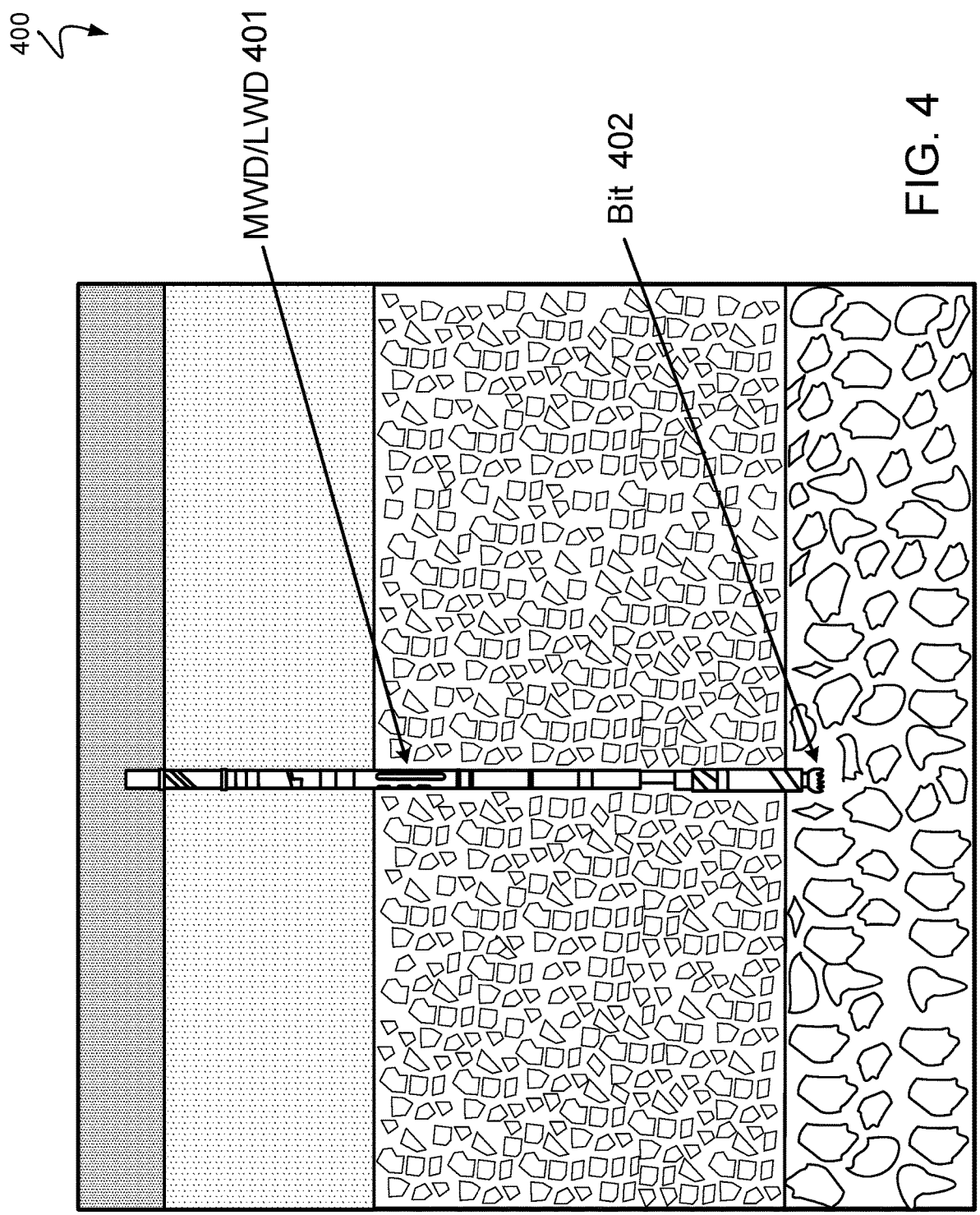
FIG. 4 illustrates formation layers with respect to a drilling bit and sensors according to an implementation of the present disclosure.

In FIG. 4, diagram 400 further illustrates an example of a bottom hole assembly (BHA) configuration in which MWD/LWD sensors 401 are mounted further away from the drilling bit 402. For example, the MWD/LWD sensors 401 can be placed 70 ft above the bit 402. Using this example, the alarm will sound a mismatch once the bit (current depth) is 5627+70=5697 ft in the illustration of FIG. 3E. The BHA assembly can be used in a drilling operation through various formations, as illustrated in FIG. 5.

Figure 6:
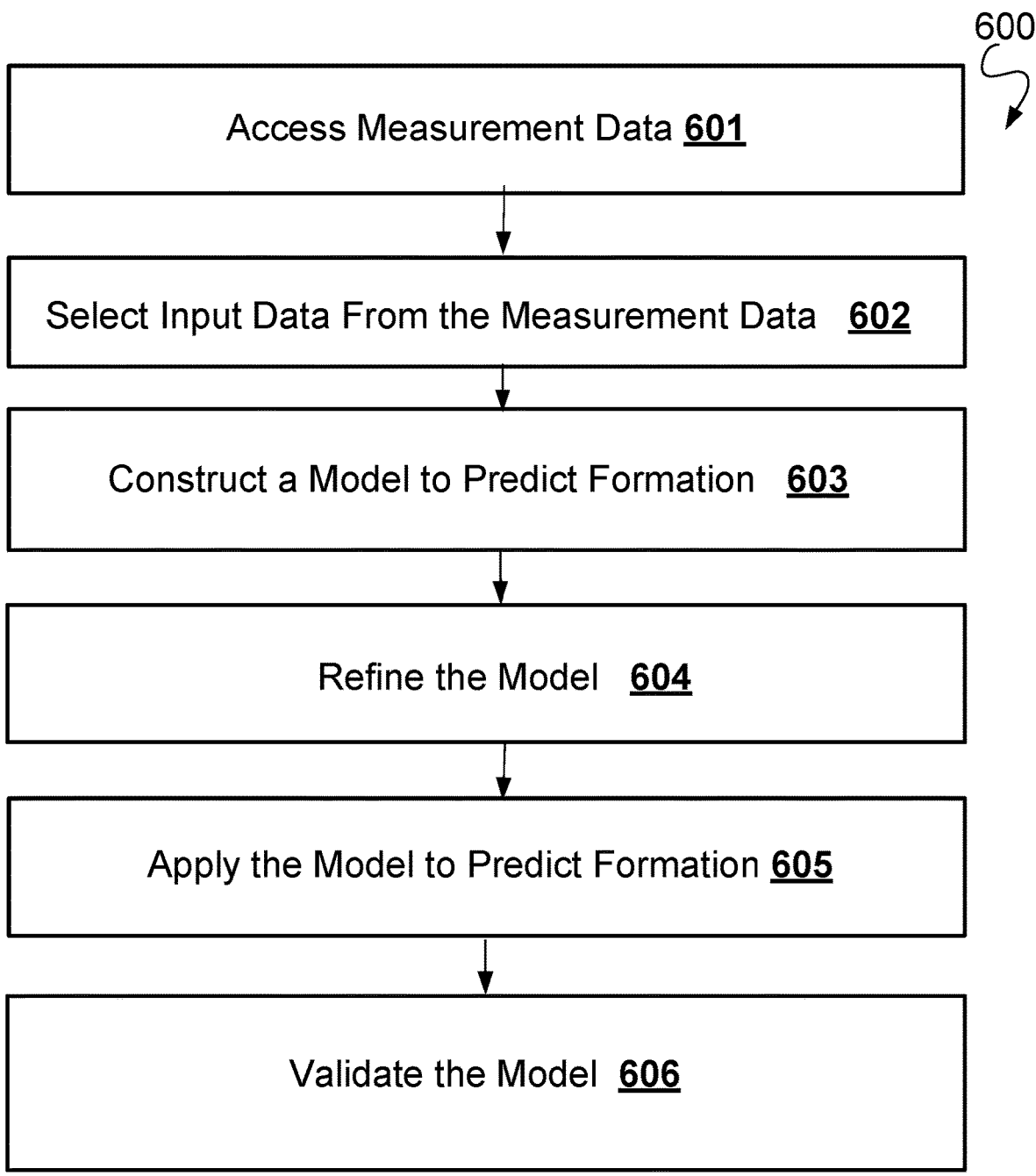
FIG. 6 shows an example of a flowchart according to an implementation of the present disclosure.

FIG. 6 shows an example of a flow chart 600 of a process according to an implementation of the present disclosure. In block 601, the process may access measurement data. The measurement data may be obtained from one or more offset wells in the same region. The measurement data may be obtained at the surface during the drilling process. Such surface measurements may be from the same well or offset wells. Examples of measurements include: rate of penetration (ROP), torque, rotation per minute (RPM), weight on bit (WOB), pumping rate in gallons per minute (GPM), and stand pipe pressure (SPP), downhole sensors (e.g. Gamma Ray sensors) from measurement while drilling (MWD) or logging while drilling (LWD) operations.

As illustrated, the process may then automatically select input data from the available measurement data (602). In some implementations, the process may select, from the available measurement data, data that are demonstratively more correlated to formation changes. For example, the process may calculate an apparent correlation between the available measurement data types and the formation type, rank the available measurement data types according to the significance of the correlation, and then select the most significantly correlated measurement data types as the input data. Additionally or alternatively, implementations may verify the correlation between a particular data type with the formation based on calibration data using downhole logging sensors. The verification may be based on new drilling data not included in the initially uploaded measurement data. The implementations may engage apply machine learning (ML) and artificial intelligence (AI) to determine the subset of input data and enable formation prediction at the level of the drilling bit.

In block 603, the process may construct a model to predict formation tops based on the selected subset of input data. For example, implementations may use machine learning analytics to predict the formation tops based on past values of the selected input data. The construction process may be iterative and can involve multiple iteration cycles. In some implementations, the model can be refined (604). For example, the refinement may be based on new drilling data not included in the initially uploaded measurement data. In some cases, the process may monitor a quantitative correlation between the selected input data and the prediction outcome. The quantitative correlation may be based on a covariance matrix used in the machine learning analytics. The quantitative correlation may be compared with a predetermined threshold. When the quantitative threshold has surpassed the threshold, the implementations may then apply the model to predict formation (605). The model may be applied to newly arriving input data of the selected data types. In some cases, the process may further validate the model (606). In some cases, the validation may include comparing the predicted formation tops with, for example, actual measurement data from MWD/LWD sensors. In these cases, the process can further retrain the model by rebuilding the entire AI or neural network to account for the new data points. Using this feedback-driven iterative loop approach, the process may include an adaptive neural network that can learn by itself in new environments.

Various implementations can relate different formations to drilling parameters using Machine Learning (ML) and Artificial Intelligence (AI), thereby enabling formation picks at the bit. Based on the values of drilling parameters that are recorded in real-time from the surface, implementations can predict the formation picks with great accuracy. If the drilling parameters are changed while drilling, the model can identify why the ROP is increased or dropped. This ability is advantageous in distinguishing whether the ROP has indeed changed because of formation change or simply due to drilling configuration change. Indeed, implementations can advantageously identify the true cause for the changed ROP, rather than an induced coincidental cause.

In comparison, conventional practice tends to pick the formation top based on simplistic assumptions using offset wells data, ROP charts, or downhole sensors such as Gamma Ray (GR). Using offset well data alone can be unreliable since down hole structures such as faults might shift the formation pick slightly between wells in the same region. Additionally, offset wells data may include inherent uncertainty itself.

ROP charts generally rely on associating ROP trends with different formations. For example, if the ROP increased then decreased and increased again, then this is a signature of a particular formation since such formation has a few thin layers on top of it that can produce the varying ROP responses. Alternatively, if the ROP suddenly jumped high in a certain trend, then this is a signature of another formation since the formation is softer and easier to drill compared to previous hard formation. This assumption of relying on ROP charts can be flawed because other drilling parameters (e.g., RPM or WOB) might change, thereby causing the ROP to jump or drop and resulting in a fake signature.

Obtaining data from downhole sensors in real-time alone can have its complications. Such MWD/LWD operations can include gamma ray (GR) or other petro-physical data capturing sensors, which are located far away from the drilling bit. This measurement lag can prevent capturing the exact formation depth at the drilling bit in realtime since the bit has to drill more footage before the MWD/LWD passes across that specific rock interval. While the formation tops might move up or down, the formation thickness may be assumed to stay the same in a certain area. Thus, once the MWD/LWD sensor picks a formation top, projects can be made about the next formation that lies at the bit depth based on the distance between the bit & MWD/LWD and the formation thickness. The offset creates multiple challenges when setting casing point across a thin layer, since going further or not reaching that specific layer can lead to severe consequences such as kicks, losses or wellbore stability which ultimately can affect the well integrity.

Implementations described by the present disclosure can pick formation tops at the bit level, representing a significant improvement over relying on offset data or ROP curves or having a sensor far away from the bit, as used by conventional methods.

Figure 7:
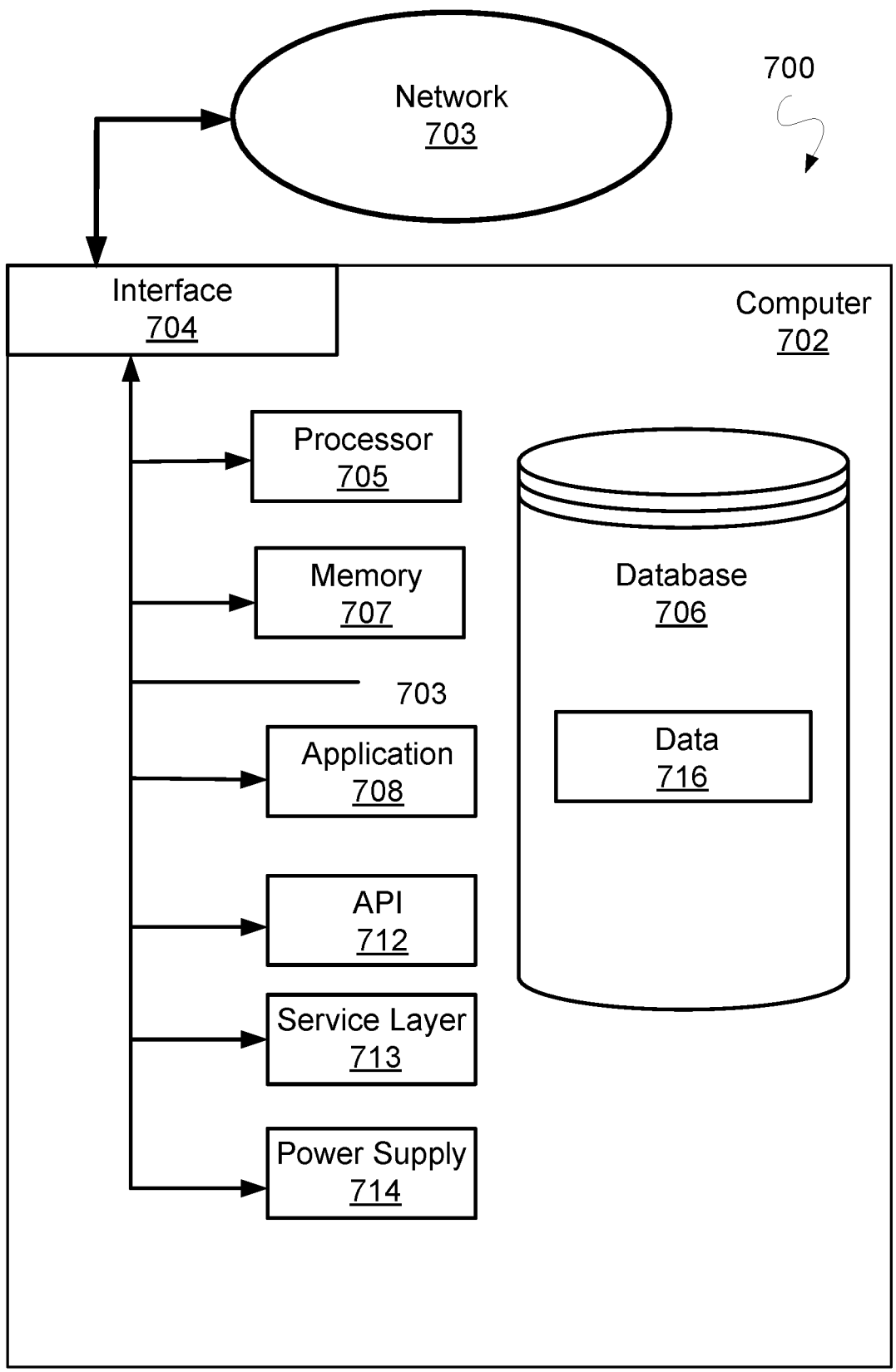
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 703. In some implementations, one or more components of the computer 702 can be configured to operate within an environment, including cloud-computing-based, local, global, another environment, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 703 (for example, from a client software application executing on another computer 702) and respond to the received requests by processing the received requests using a software application or a combination of software applications. In addition, requests can also be sent to the computer 702 from internal users, external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 703 in a distributed environment. Generally, the interface 704 is operable to communicate with the network 703 and comprises logic encoded in software, hardware, or a combination of software and hardware. More specifically, the interface 704 can comprise software supporting one or more communication protocols associated with communications such that the network 703 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 703 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds the previously described data 716 including, for example, multiple streams of data include rate of penetration (ROP), torque, rotation per minute (RPM), weight on bit (WOB), pumping rate in gallons per minute (GPM), stand pipe pressure (SPP), and data from measurement while drilling (MWD) or logging while drilling (LWD) operations, as outlined in FIGS. 3A to 3E.

The computer 702 also includes a memory 707 that can hold data for the computer 702, another component or components communicatively linked to the network 703 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 703. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   accessing measurement data obtained from surface measurements and downhole sensors during past drilling operations, wherein the measurement data show multiple measurements taken during the past drilling operations when a drilling bit is located at a range of depths;
   based on the measurement data obtained from the surface measurements, using machine learning analytics to construct a model that predicts a formation top when the drilling bit reaches a depth within the range of depths, wherein the model is calibrated by the measurement data obtained from downhole sensors located above the drilling bit during the past drilling operations;
   determining a correlation between the measurement data and the predicted formation top by:
      determining a covariance matrix between the measurement data and the predicted formation top; and
      calculating the correlation based on the covariance matrix; and
   in response to determining that the correlation exceeds a pre-determined threshold, applying the model to predict a formation top during a later drilling operation such that, based on applying the model to measurement data from surface measurements during the later drilling operation and without using measurement data from downhole sensors, an alarm is provided to an operator when the drilling bit is entering a new formation top after passing the depth.

2. The method of claim 1, wherein the multiple measurements include: rate of penetration (ROP), torque, rotation per minute (RPM), weight on bit (WOB), pumping rate, and stand pipe pressure (SPP).

3. The method of claim 2, wherein the multiple measurements further include:
   sensor measurements during a measurement while drilling (MWD) or logging while drilling (LWD) operation.

4. The method of claim 1, further comprising: selecting a subset of the measurement data as input data to the model.

5. The method of claim 4, further comprising:
   determining a correlation of each type of measurement data with the predicted formation top; and
   selecting the subset of the measurement data based on the determined correlation.

6. The method of claim 1, further comprising:
   iteratively refining the model until the correlation exceeds the pre-determined threshold.

7. The method of claim 1, further comprising:
   calibrating the model based on measurement data obtained from the downhole sensors located above the drilling bit during the past drilling operations in which the drilling bit is advanced further than the range of depths recorded by the downhole sensors.

8. A computer system comprising one or more processors configured to perform operations of:
   accessing measurement data obtained from surface measurements and downhole sensors during past drilling operations, wherein the measurement data show multiple measurements taken during the past drilling operations when a drilling bit is located at a range of depths;
   based on the measurement data obtained from the surface measurements, using machine learning analytics to construct a model that predicts a formation top when the drilling bit reaches a depth within the range of depths, wherein the model is calibrated by the measurement data obtained from downhole sensors located above the drilling bit during the past drilling operations;
   determining a correlation between the measurement data and the predicted formation top by:
      determining a covariance matrix between the measurement data and the predicted formation top; and
      calculating the correlation based on the covariance matrix; and
   in response to determining that the correlation exceeds a pre-determined threshold, applying the model to predict a formation top during a later drilling operation such that, based on applying the model to measurement data from surface measurements during the later drilling operation and without using measurement data from downhole sensors, an alarm is provided to an operator when the drilling bit is entering a new formation top after passing the depth.

9. The computer system of claim 8, wherein the multiple measurements include:
rate of penetration (ROP), torque, rotation per minute (RPM), weight on bit (WOB), pumping rate, and stand pipe pressure (SPP).

10. The computer system of claim 9, wherein the multiple measurements further include: sensor measurements during a measurement while drilling (MWD) or logging while drilling (LWD) operation.

11. The computer system of claim 8, wherein the operations further comprise:
selecting a subset of the measurement data as input data to the model.

12. The computer system of claim 11, wherein the operations further comprise:
determining a correlation of each type of measurement data with the predicted formation top; and
selecting the subset of the measurement data based on the determined correlation.

13. The computer system of claim 8, wherein the operations further comprise:
iteratively refining the model until the correlation exceeds the pre-determined threshold.

14. The computer system of claim 8, wherein the operations further comprise:
calibrating the model based on measurement data obtained from the downhole sensors located above the drilling bit during the past drilling operations in which the drilling bit is advanced further than the range of depths recorded by the downhole sensors.

15. A non-transitory computer-readable medium comprising software instructions that, when executed by a computer processor, causes the computer processor to perform operations of:
accessing measurement data obtained from surface measurements and downhole sensors during past drilling operations, wherein the measurement data show multiple measurements taken during the past drilling operations when a drilling bit is located at a range of depths;
based on the measurement data obtained from the surface measurements, using machine learning analytics to construct a model that predicts a formation top when the drilling bit reaches a depth within the range of depths, wherein the model is calibrated by the measurement data obtained from downhole sensors located above the drilling bit during the past drilling operations;
determining a correlation between the measurement data and the predicted formation top by:
determining a covariance matrix between the measurement data and the predicted formation top; and
calculating the correlation based on the covariance matrix; and
in response to determining that the correlation exceeds a pre-determined threshold, applying the model to predict a formation top during a later drilling operation such that, based on applying the model to measurement data from surface measurements during the later drilling operation and without using measurement data from downhole sensors, an alarm is provided to an operator when the drilling bit is entering a new formation top after passing the depth.

16. The non-transitory computer-readable medium of claim 15, wherein the multiple measurements include: rate of penetration (ROP), torque, rotation per minute (RPM), weight on bit (WOB), pumping rate, and stand pipe pressure (SPP), and sensor measurements during a measurement while drilling (MWD) or logging while drilling (LWD) operation.

17. The non-transitory computer-readable medium of claim 15, wherein the operations further comprise:
calibrating the model based on measurement data obtained from the downhole sensors located above the drilling bit during the past drilling operations in which the drilling bit is advanced further than the range of depths recorded by the downhole sensors.

* * * * *